United States Patent [19]
Tonn

[11] 3,919,784
[45] Nov. 18, 1975

[54] SOLAR PRE-HEAT CHAMBER FOR GRAIN DRYERS

[76] Inventor: Martin H. Tonn, Amboy, Minn. 56010

[22] Filed: Dec. 21, 1973

[21] Appl. No.: 427,146

[52] U.S. Cl................................. 34/93; 126/270
[51] Int. Cl.$^2$............................................. F24J 3/02
[58] Field of Search....... 34/93, 46; 98/55; 126/270, 126/271

[56] References Cited
UNITED STATES PATENTS

| | | | |
|---|---|---|---|
| 430,762 | 6/1890 | Taylor................................ | 34/93 X |
| 2,855,697 | 10/1958 | Barre.................................... | 34/46 |
| 3,006,818 | 10/1961 | Lapala et al..................... | 126/271 X |
| 3,022,781 | 2/1962 | Andrassy........................... | 126/271 |
| 3,044,182 | 7/1962 | Steffen............................... | 98/55 X |
| 3,231,986 | 2/1966 | Touton................................ | 34/219 |
| 3,470,626 | 10/1969 | Pfeiffer.............................. | 34/46 |

FOREIGN PATENTS OR APPLICATIONS 276,788  11/1965  Australia............................ 126/270

OTHER PUBLICATIONS

Agricultural Research, Vol. 8, May, 1960, No. 11, pub. by Agricultural Research Service, USDA, p. 14, relied upon

*Primary Examiner*—William F. O'Dea
*Assistant Examiner*—Peter D. Ferguson
*Attorney, Agent, or Firm*—Orrin M. Haugen

[57] ABSTRACT

A crop-drying system utilizing a conventional crop or grain confining bin having means for delivering drying air to the grain retained within the bin. A solar pre-heat chamber is utilized to deliver pre-heated air to the impeller, with the solar pre-heat chamber comprising an elongated tubular structure having bottom, side and top walls, and wherein the bottom wall is an opaque, highly absorbant flexible film, with the side and top walls being transparent, highly transmissive flexible films. In this fashion, solar radiation passes through the top and side walls, and is absorbed on the bottom wall where the air passing adjacent thereto becomes heated due to transfer of thermal energy by additional radiation or conductive transfer.

1 Claim, 3 Drawing Figures

SOLAR PRE-HEAT CHAMBER FOR GRAIN DRYERS

BACKGROUND OF THE INVENTION

The present invention relates generally to a crop-drying system, and more specifically to a crop-drying system which employs a solar pre-heat chamber which delivers pre-heated air either directly to the crop-drying bin, or is mixed with air heated additionally by conventional burners. The system has been found to be valuable in conserving energy which would otherwise be necessary for heating the air, such as energy derived through the burning of conventional fuels such as liquified petroleum gas or the like.

In drying of cash crops, such as corn, wheat, soybeans and the like, a grain-confining bin is employed having generally imperforate walls and top, with a vent being employed at the top of the bin. A perforated false bottom is employed in the bin so as to permit the admission and transfer of heated air through the false bottom, through the grain, and thence outwardly through the top or upper vent. An impeller is provided for delivering drying air to the zone beneath the false bottom, and thence through the grain charge and out through the vent.

In most conventional systems, a liquified petroleum gas burner is employed which heats the air being admitted to the drying bin. This heater preferably has a sensor activated burner, with the sensor detecting the relative humidity of the air being admitted to the grain-confining bin. For most drying purposes, air having a relative humidity of less than 50% must be employed, in order to achieve effective drying of the grain within the bin. It has been found that normal ambient air, when heated in a solar pre-heat chamber can be effectively elevated in temperature for temperature rises of up to 30°F. and more, and thus for most autumn days, the solar pre-heat chamber may be utilized effectively without requiring supplemental heat from the liquified petroleum gas burner. Obviously, these conditions apply only during the sunlight hours, and night-time hours may require more frequent cycling of the liquified petroleum gas burner.

SUMMARY OF THE INVENTION

The solar pre-heat chamber of the present invention is designed to be coupled to the inlet to the impeller, and thence ultimately through the system. Preferably, the solar pre-heat chamber is an elongated structure having a bottom wall, side and top walls, with the walls being wrapped about a frame means which define the periphery of the chamber. The bottom wall is preferably disposed immediately upon the ground, and is in the form of a solar absorbing flexible film, such as black polyethylene film, with the side and top walls being clear transparent films highly transmissive to solar radiation. The rays from the sun which penetrate the top and side walls impinge upon the bottom wall where they are absorbed, and by thermal and radiant transfer, the air moving through the chamber becomes heated.

Therefore, it is a primary object of the present invention to provide a solar pre-heat chamber which is effective in elevating the temperature of atmospheric air being utilized in a grain-drying system.

It is yet a further object of the present invention to provide an improved solar pre-heat chamber to be used with grain-drying systems wherein the solar energy may be utilized to supplement the thermal energy available from a conventional liquified petroleum gas burner.

It is yet a further object of the present invention to provide an improved solar pre-heat chamber for use in combination with a crop-drying bin, wherein solar preheated air is fed into the bin for extracting moisture from the grain to increase the drying rate thereof.

Other and further objects of the present invention will become apparent to those skilled in the art upon a study of the following specification, appended claims, and accompanying drawing.

DESCRIPTION OF THE PREFERRED EMBRODIMENT

Figure 1:
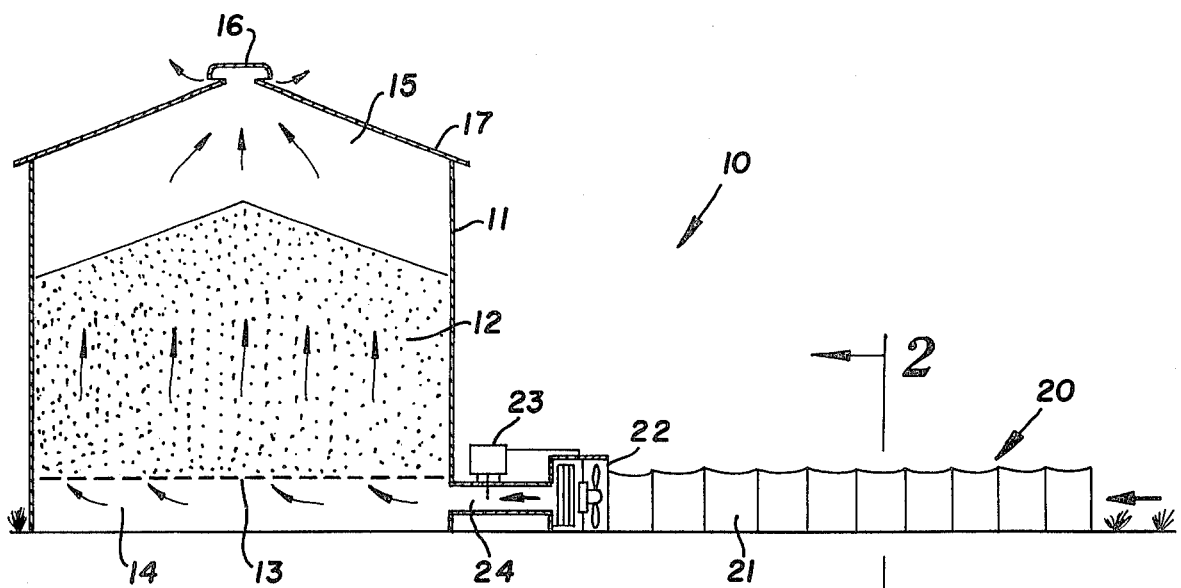
FIG. 1 is a schematic illustration, partially broken away, and illustrating a conventional grain-drying system utilizing the solar pre-heating chamber of the present invention.

In accordance with the preferred embodiment of the present invention, the grain-drying system generally designated 10 includes a grain-confining bin having generally cylindrical side walls 11 for confining a load of grain therein, with the grain being shown at 12. The grain is supported on a perforate base member 13, which provides a zone 14 for delivering drying air to the grain supporting base 13. The grain 12 occupies, of course, most of the volume of the bin, and the upper zone 15 is utilized to move the drying air outwardly of the bin through vent 16 formed in cover member or roof 17. In this connection, the bin, as defined, is conventional and is among any of a variety which are commercially available.

The air which is passed through the system is transmitted through the solar pre-heat chamber generally designated 20, which includes a cover member comprising the side and top walls of the chamber, as shown at 21, with the chamber being in communication with the inlet 22 to the bin. Inlet 22 houses an impeller, as indicated, with a heater being shown at 23 for introducing thermal energy to the air admitted to the system. Again, this portion of the system is conventional and known in the art, and also available commercially. The throat of the inlet 24 receives heated air for transmission through the grain retained in the bin.

Figure 2:
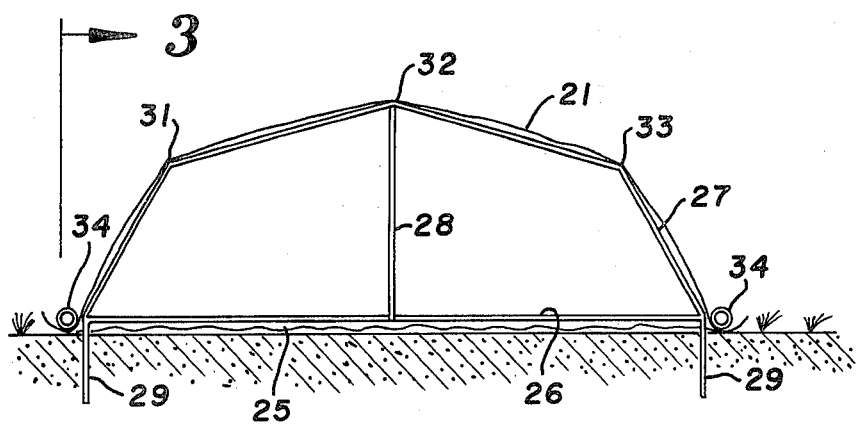
FIG. 2 is a vertical sectional view taken along the line and in the direction of the arrows 2—2 of FIG. 1.
Figure 3:
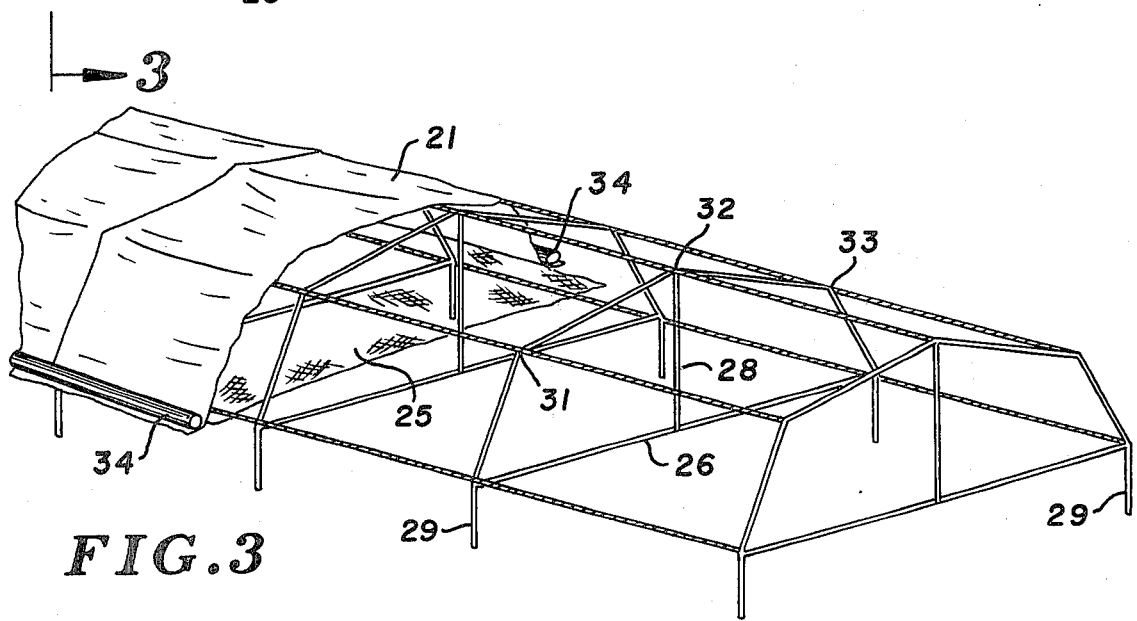
FIG. 3 is a side elevational view, partially broken away, and illustrating the solar pre-heating chamber of the present invention generally along the line and in the direction of the arrows 3—3 of FIG. 2.

Turning now to the details of the solar pre-heat chamber 20, attention is directed to FIGS. 2 and 3 wherein these details are illustrated more specifically. As indicated, the top and side walls of the chamber are formed by flexible film member 21, which is preferably 1 mil polyethylene, transparent and clear. The base member for the chamber is illustrated at 25, this base being an opaque flexible film, such as opaque black polyethylene film, this film being dyed with carbon black pigments. Film 25 is laid upon the surface of the ground, and is held in place by horizontal bar rails 26 of the frame means to be described more in detail hereinafter.

Frame means include the bottom rails 26 along with generally "U"-shaped members 27 which define the side and top walls of the chamber. A support strut or post is shown at 28. In order to provide support within the ground, leg extensions 29—29 are provided for setting the frame in place. A plurality of these spaced frames are then placed in position, and a plurality of horizontal support rails are provided, such as in the form of lines or ropes 31, 32, and 33. As many of these horizontal support rails are provided as are reasonably indicated to simply retain the transparent film 21 in generally confining disposition about the circumference of the generally "U"-shaped support members. In order to retain the ends of the film members 21 and 25 in place, a weighted member such as a length of pipe 34—34 may be provided, thus keeping the chamber airtight and free from collapse due to rain, snow, wind, or the like.

It will be appreciated that the present system improves the economics of the grain-drying operations by providing solar pre-heated energy to be transmitted to the grain-confining bin. As has been indicated, a 30° F. rise may be achieved with sunlight available on a clear day at 45° North latitude, during the month of September, and up until and through the early days of October. Obviously, individual intensity of sunlight, availability of sunlight due to cloudy conditions, and the like must be taken into account, however these conditions will merely determine the quantity of liquified petroleum gas which may otherwise be required for the grain-drying operation. Also, it will be appreciated that the system may be functional on days when the relative humidity may be reasonably high, with the solar energy being utilized to increase the temperature of the incoming air and thus achieve a substantial drop in the relative humidity. In other words, grain may be effectively dried through the influence of solar energy even when the outdoor conditions provide atmospheric air at 60° F. and 80% relative humidity.

In order to effectively cycle the liquified petroleum gas burner, a relative humidity sensor will be interposed in the throat area 24 of the system, and when the relative humidity of the solar pre-heated air is in excess of about 50%, the burner will be cycled on in order to raise the temperature sufficiently so as to drop the relative humidity to a level below 50%. Again, this arrangement is conventional in many grain-drying systems, with the burner being energized or cycled each time the atmospheric air conditions provided air at a relative humidity of greater than 50%.

For materials of construction, the bin walls 11 and 17 are preferably fabricated from corrugated sheet metal, such as galvanized iron or the like. Again, these chambers are commercially available and provide the generally imperforate walls and top. Normally, the side walls are cylindrical and thus define a cylindrical chamber.

It will be appreciated that the elongated chamber 20 may have any convenient length-to-width ratio. It has been found, however, that a length-to-width ratio of greater than about 10 is desired for effective operation, with a convenient dimension being a chamber having a length of about 100 ft. and a width of about 8 ft. Such a ratio of length to width provides sufficient thermal gain for air under those conditions normally encountered at 45° North latitude in the autumn months.

The crop drying system of the present invention is capable of application to batch-drying apparatus as well. In such a system, batch-drying occurs at a location remote from the ultimate storage bin, and individual batches of dried grain are transferred from the drying station to the storage bin. It will be appreciated, therefore, that the solar energy extracting means for heating and drying air prior to passage through the drying bin is usable in connection with batch systems as well as bin-drying systems.

I claim:

1. In a crop-drying system including a grain-confining bin having generally inperforate top and side walls, venting means at the top of said bin, and grain-supporting perforate base means adjacent the base of said bin, said imperforate side and top walls, and said grain-supporting perforate base defining a grain-drying chamber, impeller means for forcibly delivering drying air to a zone beneath said grain-supporting perforate base for passage through said drying chamber and including solar energy extracting means for heating said drying air prior to passage through said drying bin, said solar energy extracting means comprising:
   a. an elongated solar heating chamber having one end in direct communication with the input end of said impeller means, and with the opposed remote end in communication with atmosphere, and comprising frame means with generally water impermeable bottom, side and top walls, said walls being wrapped about said frame means and defining said solar heating chamber, said solar heating chamber having a length-to-width dimension ratio of at least about 10;
   b. said bottom wall being an opaque flexible cohesive film, highly absorbant to solar radiation, with said side and top walls being transparent flexible cohesive films, highly transmissive to solar radiation; and
   c. the input end of said impeller means receiving drying air from said elongated solar heating chamber and from the ambient.

* * * * *